United States Patent
Lin et al.

(10) Patent No.: US 7,688,975 B2
(45) Date of Patent: Mar. 30, 2010

(54) METHOD AND APPARATUS FOR DYNAMIC GENERATION OF SYMMETRIC ENCRYPTION KEYS AND EXCHANGE OF DYNAMIC SYMMETRIC KEY INFRASTRUCTURE

(75) Inventors: Paul Lin, Fremont, CA (US); Henry Hon, Berkeley, CA (US)

(73) Assignee: Authenex, Inc., San Jose, CA (US)

( * ) Notice: Subject to any disclaimer, the term of this patent is extended or adjusted under 35 U.S.C. 154(b) by 1595 days.

(21) Appl. No.: 10/280,796

(22) Filed: Oct. 25, 2002

(65) Prior Publication Data

US 2003/0081774 A1 May 1, 2003

Related U.S. Application Data

(60) Provisional application No. 60/348,104, filed on Oct. 26, 2001.

(51) Int. Cl.
*H04L 9/00* (2006.01)
(52) U.S. Cl. .................. 380/44; 380/259; 380/277; 713/171; 713/189; 726/9; 726/20
(58) Field of Classification Search ............ 380/44
See application file for complete search history.

(56) References Cited

U.S. PATENT DOCUMENTS

| 5,023,908 | A | * | 6/1991 | Weiss | 713/184 |
| 5,241,599 | A | * | 8/1993 | Bellovin et al. | 713/171 |
| 5,995,624 | A | * | 11/1999 | Fielder et al. | 713/169 |
| 6,075,860 | A | * | 6/2000 | Ketcham | 713/159 |
| 6,351,813 | B1 | * | 2/2002 | Mooney et al. | 713/185 |
| 6,490,680 | B1 | * | 12/2002 | Scheidt et al. | 713/166 |
| 6,985,583 | B1 | * | 1/2006 | Brainard et al. | 380/44 |
| 7,272,723 | B1 | * | 9/2007 | Abbott et al. | 713/185 |
| 2002/0031230 | A1 | * | 3/2002 | Sweet et al. | 380/278 |
| 2002/0184217 | A1 | * | 12/2002 | Bisbee et al. | 707/9 |

* cited by examiner

*Primary Examiner*—Emmanuel L Moise
*Assistant Examiner*—Shewaye Gelagay
(74) *Attorney, Agent, or Firm*—Stevens Law Group; David R. Stevens

(57) ABSTRACT

A method and apparatus for dynamically generating data encryption keys for encrypting data files and for decrypting encrypted data files via a key exchange method is provided. A dynamically generated an encryption key is generated for each encryption event, so that the key cannot be produced or reproduced. A key exchange component of the invention ensures that only an intended recipient has the means to decrypt a file encrypted with the dynamically generated symmetric encryption keys.

9 Claims, 3 Drawing Sheets

METHOD AND APPARATUS FOR DYNAMIC GENERATION OF SYMMETRIC ENCRYPTION KEYS AND EXCHANGE OF DYNAMIC SYMMETRIC KEY INFRASTRUCTURE

CROSS-REFERENCE TO RELATED APPLICATIONS

This Application is a non-provisional application of Provisional Application No. 60/348,104, filed on Oct. 26, 2001.

BACKGROUND OF THE INVENTION

1. Field of the Invention

The present invention relates generally to data encryption and decryption systems and methods and, more particularly, to a method and apparatus for dynamically generating data encryption keys for encrypting data files and for decrypting encrypted data files via a key exchange method.

2. Background Information

The Internet is fast becoming the primary platform for global commerce and communications. The ease of communication that encourages the Internet's growth, also makes it difficult to ensure the security of Internet transactions. Users of the Internet demand mechanisms that guarantee the integrity of the information they transmit over the Internet and provide the same level of trust as paper-based transactions.

Before committing sensitive communications to the Internet, users like specific assurances. Firstly, electronic transactions need to be confidential and protected from tampering. Secondly, they need to be able to trust that participants are who they claim to be. Lastly, they want to be assured that no one can deny their involvement in a transaction after the fact.

Public Key Infrastructure (PKI) is a known attempt to provide these assurances. PKI is a framework of policies, services, hardware, and encryption software that is based on the use of public key cryptography and digital signatures.

Public key cryptography uses a mathematical algorithm, or key, to encrypt data, and a related mathematical key to decrypt the data. Authorized users of public key cryptography receive encryption software and a key pair. The keys in a key pair are related so that a message encrypted with a user's public key can only be decrypted using the corresponding private key. One key is an accessible public key, and the other key is a private key that the user must keep secret. In Public key cryptography, public keys are published in electronic directories.

A Certification Authority (CA) is a main component of a PKI. A CA is a trusted third party responsible for issuing Digital Certificates and managing them throughout their lifetime. Digital Certificates are electronic files containing a user's public key and specific identifying information about the user. The CA certifies that the individual granted the digital certificate is who they claim to be.

A Digital Signature is an electronic identifier comparable to a traditional, paper-based signature. A digital signature is unique, verifiable, and only the signer can initiate it. A digital signature ensures that the information contained in a digitally signed message or document is not altered during transmission.

In use, a source user desires to transmit a message electronically to a destination user, via PKI. The source user needs to prove that it sent the message and ensure that its contents are not altered. PKI software used by the source user utilizes the source user's private key to create a digital signature for the message. The source user further desires to ensure that no one, other than the destination user is able to read the message. The source user's software utilizes the public key of the destination user to encrypt the message.

The destination user desires to read the message. The destination user's software utlizes destination user's private key to decrypt the message. The destination user needs to verify that the source user sent the message and that its contents have not been altered. The destination user's software utilizes the source user's public key to verify its digital signature. The destination user can then read the message.

A disadvantage of public key encryption is that it may be vulnerable to "Man-In-The-Middle" (MITM) attacks, since the possessors of the keys may be unable to verify the identity of each other. A Man-In-The-Middle (MITM) attack typically involves an interceptor posing as a target, which may be a sever or a user, for example. The interceptor uses its own public key, instead of the target's public key, for asymmetric encryption. This allows the interceptor to decrypt confidential data that is intended for the target. The interceptor can then use this decrypted information to gain unauthorized access to the target's confidential information.

Another known method of obtaining unauthorized access to encrypted data is a "replay" attack. Web browsers may be vulnerable to a replay attacks, if a user's authentication keys are captured or intercepted by an attacker. In a replay attack, an attacker directly uses authentication keys, such as a session ID in a URL cookie, for example. For clarification, "URL" is an acronym for Uniform Resource Locator. A URL is an address for a resource on the Internet used by Web browsers to locate Internet resources. The attacker uses the authentication key to obtain or create service to a user's account, while bypassing normal user authentication, such as logging in with the appropriate username or password.

For example, an attacker discovers a URL that contains session ID information. With this information, the attacker may be able to obtain or create service to a user's account contained in the session ID information, simply by pasting that URL back into the internet address widow of their web browser. The legitimate user may not need to be logged into the application at the time of the replay attack.

Another disadvantage of PKI is that since it is dependent upon private and public keys, designing and building full-featured PKI is difficult. Due to the inherent complexity of designing and building a PKI, implementations are not common. Further, there are significant interoperability and management challenges associated with PKI. Given the potential numbers of digital certificates that PKI involves, another disadvantage of PKI is the administration and management of certificates. Resultantly, PKI and the training therefor can be expensive and complex.

Additionally, a hardware device should be utilized with PKI. Since the security provided by PKI can be breached if the private key is compromised, as discussed above, a hardware device may inhibit these security breaches.

BRIEF SUMMARY OF THE INVENTION

The present invention provides a method and apparatus for dynamically generating data encryption keys for encrypting data files and for decrypting encrypted data files via a key exchange method. The present invention provides a method and apparatus for dynamically generating an encryption key for each encryption event. The dynamically generated encryption key is not saved after an encryption event, so that the key cannot be produced or reproduced. Resultantly, a file encrypted with the dynamically generated key is prevented from unauthorized decryption. Thus, the present invention is not substantially susceptible to MITM, replay, and other unauthorized data decryption attacks.

In operation, a user selects a file to encrypt. The invented method generates a challenge and transmits the challenge to a token device coupled, to the computer. The challenge may include a challenge puzzle, key ID, and user generated code. A portion of a memory of the token may function as an identification (ID) pad and another portion of the memory may be used for storing one or more encryption/decryption keys. The challenge is decomposed to recover the challenge puzzle, key ID, and user generated code. The challenge puzzle and key ID determine which two shared secrets stored in the token's memory device are to be sent to a processor of the token.

The token's processor, may be running a data encryption/decryption algorithm, such as an Advanced Encryption Standard (AES) technology type data encryption/decryption algorithm. The two shared secrets are fed into the data encryption/decryption algorithm to generate a puzzle key. The user generated code and puzzle key are then fed into the data encryption/decryption algorithm to generate a dynamic file key. The method uses the dynamic file key, to encrypt the selected file. Any type of file may be encrypted using the invented method.

Decryption information is then appended to the encrypted file. The decryption information may be in the form of a header or footer. The decryption information may include an electronic serial number (ESN) of the token device that generated the dynamic file key, the challenge sent to the token device, and attributes of the file. Thus, encryption/decryption keys used to encrypt the file are not stored in the footer, nor at any other location and copying or decrypting the dynamic file key is prevented.

Additionally, a component of the present invention comprises a module for exchanging dynamically generated symmetric encryption keys, so that only an intended recipient has the means to decrypt a file encrypted with the dynamically generated symmetric encryption keys. In use, an originator desires to transfer the encrypted file to an intended recipient.

The key exchange module may append a key exchange footer to the encrypted file. The key exchange footer may include an electronic serial number (ESN) of a token device controlled by the recipient and other information. Once the key exchange footer is appended to the encrypted file, a key exchange package is created that comprises the encrypted file and key exchange footer.

The originator may invoke the appending of the key exchange footer to the encrypted file. The originator may desire to transmit the encrypted file to the recipient via email. The originator prepares an email message, then may invoke the key exchange module to append the key exchange footer to the encrypted file. The key exchange package is then sent to the recipient.

Alternatively, the originator may desire to transmit a non-encrypted message to the recipient. In this instance, the invented key exchange method will sense that the file is not encrypted. The dynamic key exchange module generates a challenge used to encrypt the message, to generate the key exchange package. The dynamic key exchange package is then sent to the recipient.

The recipient's computer, running the invented method, senses receipt of the key exchange package. The package is processed to extract the key exchange footer from the encrypted file. The key exchange footer is then transmitted to a key exchange server. The key exchange server may comprise a remotely located server, such as a sever of a computer.

The key exchange server, hereinafter server, running the invented method, receives the key exchange footer and extracts the challenge therefrom. The server uses the challenge to generate the dynamic file key. Simultaneously, the server generates a key exchange challenge that is transmitted to the recipient's token. The key exchange challenge is also used to generate a dynamic symmetric encryption key. The dynamic symmetric encryption key and dynamic file key are fed into a data encryption/decryption algorithm running on the server. The algorithm uses the dynamic encryption key to encrypt the dynamic file key. The encrypted dynamic file key is then transmitted to the recipient's token.

The recipient's token receives the server's key exchange challenge and processes the challenge. Using the key exchange challenge, the recipient's token generates the dynamic encryption key. The encrypted file key and dynamic encryption key are then fed into the token's processor to decrypt the dynamic file key. Thus, the invented method is capable of generating an encryption/decryption keys in a reduced amount of time, reducing the processing time of the invented method.

The encrypted file is then decrypted by first extracting the decryption information footer from the encrypted file. The file is decrypted using a process analogous to the encryption process discussed above. The file attributes are then restored, and the recipient may freely access and manipulate the file.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

The present invention provides a method and apparatus for dynamically generating data encryption keys for encrypting data files and for decrypting encrypted data files via a key exchange method. The present invention provides a method and apparatus for dynamically generating an encryption key for each encryption event. The dynamically generated encryption key is not saved after an encryption event, so that the key cannot be produced or reproduced. Resultantly, a file encrypted with the dynamically generated key is prevented from unauthorized decryption. Thus, the present invention is not substantially susceptible to MITM, replay, and other unauthorized data decryption attacks.

Figure 1:
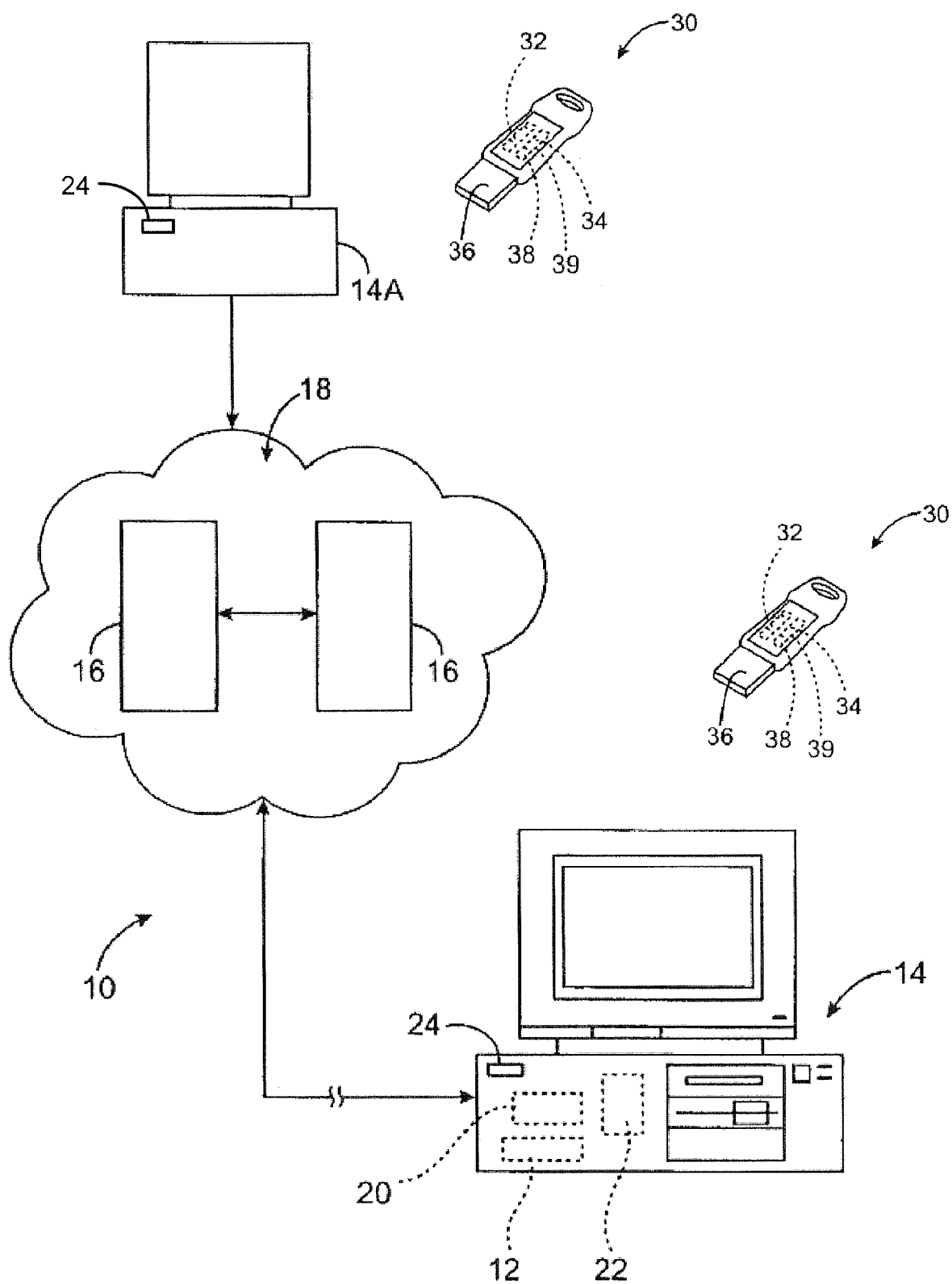
FIG. 1 is a schematic diagram showing computers coupled to a computer network and a token device of a preferred embodiment of the method and apparatus of the present invention.

Referring now to FIG. 1 of the drawings, there is shown generally at 10, a preferred embodiment of the apparatus of the present invention. A preferred embodiment of the method of the present invention may be uploaded to a data storage device 12 of a computer 14, using known means. For example, the invented method may be provided in the form of a computer program and uploaded onto the computer 14 and stored on the storage device 12, as is well known.

Similarly, the preferred embodiment of the method of the present invention may be installed on one or more servers 16 of a computer network, shown generally at 18. The computer network 18 may comprise a multiplicity of servers 16, several of which may be interconnected at any given time. The computer network 18 may comprise the Internet, a Remote VPN network, a LAN/WAN network, or a wireless network.

As referred to hereinafter, the term "computer" references any device capable of coupling to the computer network 18 and capable of receiving data for processing. The computer 14 may comprise any remote computing terminal, or computer terminal, which can provide access to the network 18. A well known ATM machine is an example of a computer terminal. The computer 14 may be provided with a processor 20 for processing data and a memory 22 for storing data. The computer 14 may include a data port 24 to allow coupling of external devices to the network 18, via the computer 14.

The computer 14 may be coupled to the network 18 via any known means. The computer 14 may be continuously coupled to the network 18, via a high bandwidth digital communications line, or may be intermittently coupled to the network 18, via a modem, for example.

A unique token device, or token, 30 is configured to be detachably coupled to the data port 24. The token 30 and data port 24 may be configured in any desired mutually compatible form factor which affords coupling and decoupling of the token 30 with the data port 24, and thus to the network 18 via the computer 14. For example, the data port 24 may comprise a known USB (Universal Serial Bus) port or similar data port.

The token 30 preferably includes an on-board processor 32 for processing data, a memory device 34 for storing data, and a coupling portion 36 for coupling the token 30 to the data port 24. The on-board processor 32 is preferably capable of processing 128-bit data. Preferably, the processor 32 is capable of running a data encryption/decryption algorithm. Most preferably, the processor 32 is capable of running an Advanced Encryption Standard (AES) technology data encryption/decryption algorithm.

The token's memory device, hereinafter memory, 34 may comprise a nonvolatile memory device that is configured to maintain data when power to the token 30 is removed. Preferably, the memory device 34 comprises a known flash memory device. Symmetric shared secrets are stored in the memory 34. A portion of the memory 34 may function as an identification (ID) pad 38. Different values may be stored in predetermined address locations in the ID pad 38 during manufacture of the token 30. The different values stored in predetermined address locations of the ID pad 38 comprise a portion of a shared secret.

One or more encryption/decryption keys may also be stored in a key storage region 39 of the memory 34 during manufacture thereof. Each encryption/decryption key stored in the memory 34 may comprise a unique string of information and is the other portion of a shared secret. Since the symmetric shared secrets are embedded in the token's memory 34 during manufacture, the need for transmitting keys, and thus key exchanges, between two parties over the network 18 is eliminated. Thus, MITM attacks are prevented, since there is no key exchange and the MITM cannot steal encryption/decryption keys.

The encryption/decryption keys that are stored in the token 30 may depend upon certain factors. For example, if a user that is going to control the token 30 requests access to a particular server that requires a particular encryption/decryption key, then that key is stored in the memory 34. In addition, certain servers that do not generate challenges may require another key, for example.

The token 30 may be distributed to a user, sometimes referred to in the art as a client, using any known and applicable distribution means. When a user receives the token 30, they must contact the distributor of the token 30, or other appropriate party, to verify that they possess the token 30. The user contacts the distributor and provides identifying information to the distributor, who verifies the client. At that time, the user may generate user code that may be stored in the token's memory 34. Alternatively, the user may generate the user code prior to, or during, and encryption event, thoroughly discussed hereinafter.

Preferably, the recipient controls a computer 14A that is coupled to the network 18 and a token device (not shown) that may coupled to the computer 14A. The recipient's computer 14A may be substantially similar to the computer 14 discussed above, or may be a computer terminal as discussed. Preferably, the recipient's token device is identical to the token device 30.

Figure 2:
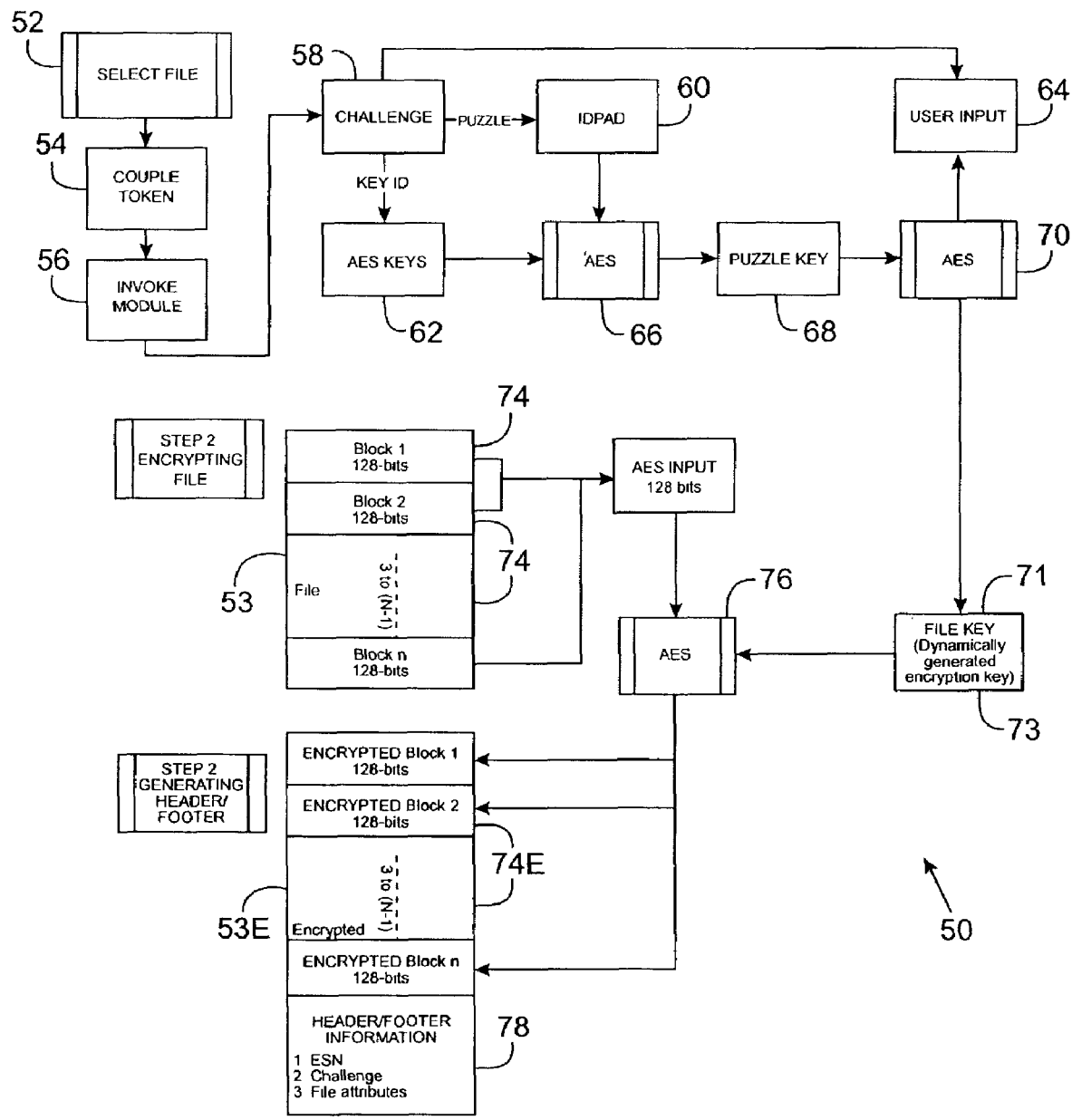
FIG. 2 is a flow chart showing a preferred embodiment of a module for dynamically generating a data encryption key for encrypting a data file of the method of the present invention.

Referring now to FIG. 1 and FIG. 2 of the drawings, there is shown generally at 50, a preferred embodiment of a module for dynamically generating a data encryption key for encrypting a data file of the method of the present invention. An originating user, hereinafter originator for sake of clarity only, desires to transmit a file to a recipient user, hereinafter recipient for sake of clarity only. It is to be understood that the terms "user", "originator", and "recipient" may embody any entity that possess a token 30, and which is capable of controlling the token 30 and computer 14. Additionally, hereinafter originator 14 refers to the computer 14 and any entity controlling the computer 14 and token 30, unless otherwise indicated. Similarly, hereinafter recipient 14A refers to the computer 14A and any entity controlling the computer 14A and token 30, unless otherwise indicated.

The originator 14 desires to encrypt the file to protect the information comprising the file. As shown in process block 52, the originator 14 selects a file 53 to encrypt. The file 53 may be stored on the storage device 12 of the computer 14. The originator 14 then couples their token 30 to the computer 14, as shown in process block 54, if they have not already done so.

The computer 14 may be running a preferred embodiment of the dynamic symmetric key generation and data file encryption module of the invented method of the present invention. If the key generation module is not running when the token 30 is coupled to the computer 14, the originator 14 may invoke the module, shown in process block 56, using any one of several well known means.

The key generation module generates a challenge that may be in the form of a 128-bit number. The challenge may include a challenge puzzle, key ID, and user code. The user code may be generated by a user, such as the originator 14 or recipient 14A, and stored in the token's memory 34 or may be stored in memory 34 during manufacture of the token 30.

As shown in process block 58, the challenge is transmitted to the token 30. The token 30 receives the challenge, which is processed by the token's processor 32. The challenge is decomposed to recover the challenge puzzle, key ID, and user code. The challenge puzzle is sent to the ID pad, shown in process block 60, the key ID is sent to the key storage region 39 of memory 34, shown in process block 62, and the user code is stored in memory, shown in data block 64.

The challenge puzzle is mapped to the ID pad 38 region of the token's memory 34. Preferably, the challenge puzzle functions as a set of instructions for accessing selected data address locations in the ID pad 38 for retrieving a portion of a selected shared secret from memory 34. The values stored in the selected address locations are retrieved and fed into the token's processor 32 for processing, shown in process block 66.

Similarly, the key ID identifies which particular encryption/decryption key stored in the key storage region 39 of memory 34 corresponds to the remaining portion of the selected shared secret. The encryption/decryption key identified by the key ID is then retrieved from memory 34, shown in process block 62. Once retrieve from memory 34, the selected key is fed into the processor 32 for processing, shown in block 66.

The token's processor 32, preferably running an AES data encryption/decryption algorithm, performs a first round of data encryption using the two portions of the shared secret, i.e. the values stored in the selected address locations of the ID pad 38 and the selected encryption/decryption key, as shown in process block 66. The result of the first round of data encryption is an encrypted puzzle key, shown in data block 68.

The encrypted puzzle key is fed back into the processor 32 and the user code is retrieved from memory 34 and fed into the token's processor 32, to perform a second round of data encryption, shown in process block 70. The second round of encryption 70 generates a dynamic file key 71. Since the dynamic file key 71 is dynamically generated, it is not transmitted over the network 18 and is not saved after an encryption. Replay attacks and other unauthorized decryption of the dynamic file key 71 may be inhibited. The dynamic file key 71 may be a 128 bit number.

Using the dynamic file key 71, the selected file 53 is encrypted. Any type of file may be encrypted using the invented method. For example, program files, document files, and graphics files may be encrypted by the method. The file 53 to be encrypted is decomposed into data blocks 74. Using the dynamic file key 71, each data block 74 is individually encrypted, shown in process block 76, to generate encrypted data blocks 74E. The data blocks 74 are individually encrypted until the file 53 is completely encrypted, to generate an encrypted file 53E. For example using AES encryption, if the file 53 is 1024 KB, then the file 53 is encrypted in 128-bit blocks, until the encrypted file 53E is generated.

Decryption information 78 is then appended to the encrypted file 53E. The decryption information 78 may be in the form of a header or footer, for example. The decryption information header/footer, hereinafter decryption information footer 78 for sake of clarity only, may include an electronic serial number (ESN) of the token device that generated the dynamic file key 71, the challenge sent to the token device, and attributes of the encrypted file 53E. The file attributes may include file information such as file length and file type. Thus, encryption/decryption keys used to encrypt the file 53E are not stored in the footer 78, nor at any other location and copying or decrypting the dynamic file key 71 is prevented.

Figure 3:
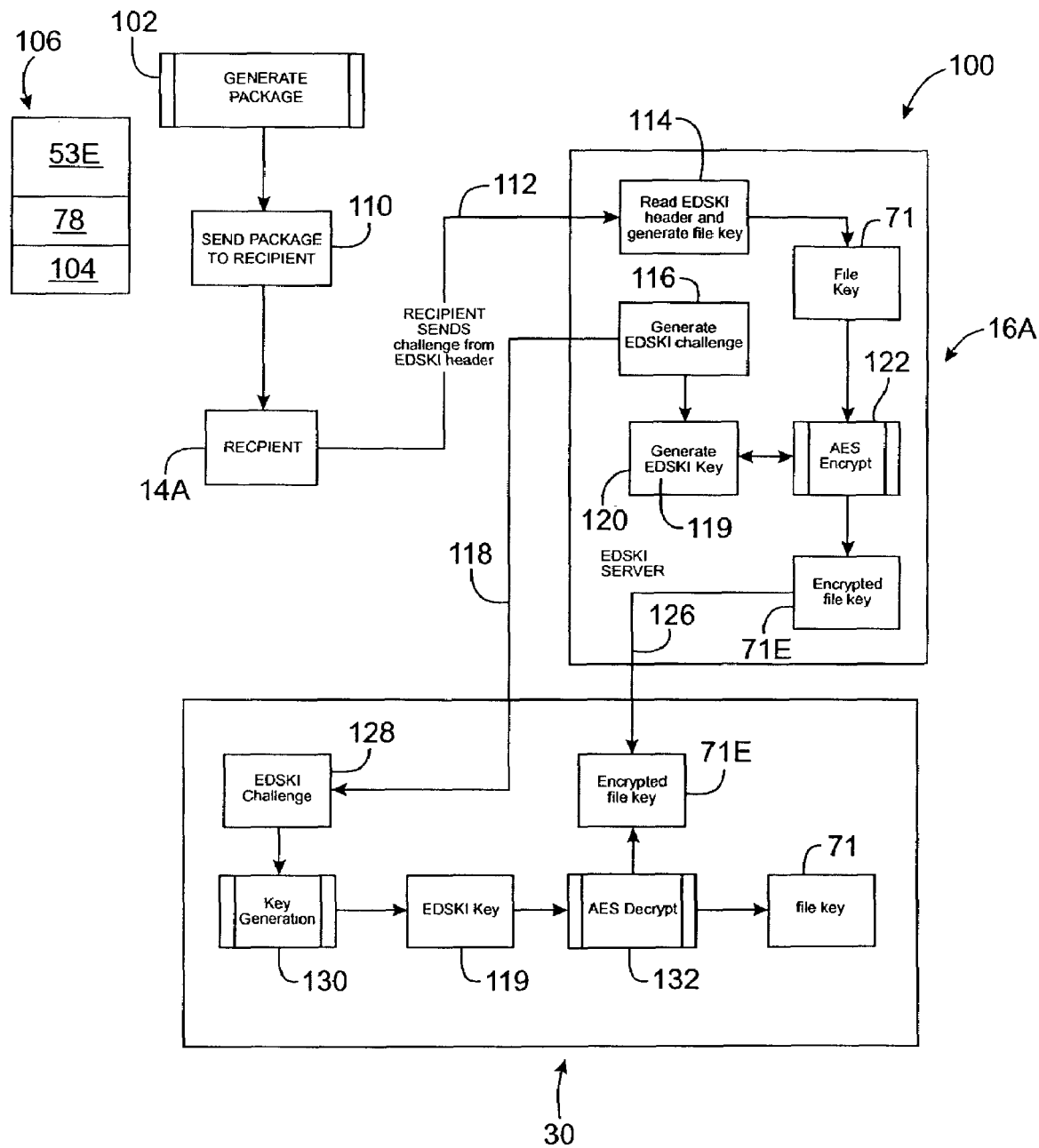
FIG. 3 is a flow chart showing a preferred embodiment of a module for exchanging dynamically generated symmetric encryption keys of the method of the present invention.

Referring now to FIG. 1, FIG. 2, and FIG. 3 of the drawings, and particularly to FIG. 3 there is shown, generally at 100, a preferred embodiment of a module for exchanging dynamically generated symmetric encryption keys, of the method present invention of the present invention. The invented dynamic key exchange module provides a method of exchanging dynamically generated symmetric encryption keys, so that only an intended recipient has the means to decrypt a file encrypted with the dynamically generated symmetric encryption keys.

As shown in process block 102, the dynamic key exchange module may append an additional header/footer 104 to the encrypted file 53E. The additional header/footer, hereinafter key exchange footer 104 for sake of clarity only, may be provided to allow the exchange of dynamically generated symmetric keys. The key exchange footer 104 may include an electronic serial number (ESN) of a token 30 controlled by the recipient 14A and other information. The key exchange footer 104 is appended to the encrypted file 53E, to create a key exchange package 106. Thus, the key exchange package 106 comprises the encrypted file 53E and key exchange footer 104.

The originator 14 may invoke the appending of the key exchange footer 104 to the encrypted file 53E at any time prior to transmitting the key exchange package 106 to the recipient 14A. The appending of the key exchange footer 104 to the encrypted file 53E may be invoked by any appropriate means. The originator 14 may transmit the encrypted file to the recipient 14A via known means, such as via email over the network 18, which may comprise the Internet.

For example, the originator 14 prepares an email message to the recipient 14A, using any known applicable program. The originator 14 may then invoke the key exchange module 100 to append the key exchange footer 104 to the encrypted file 53E, to generate the key exchange package 106. The key exchange package 106 is then transmitted to the recipient 14A, as shown in process block 110.

Alternatively, information that the originator 14 intends on transmitting to the recipient 14A, may not be encrypted. The originator 14 may desire to transmit a text message to the recipient 14A, without first encrypting the message. In this instance, the invented key exchange module 100 will sense that the file is not encrypted. The dynamic key exchange module will generate a challenge using the challenge generating methods discussed previously. The challenge will then encrypt the message to generate the key exchange package 106. The dynamic key exchange package 106 is then sent to the recipient 14A, as shown in process block 110.

The recipient's computer 14A, running the invented method, senses receipt of the key exchange package 106. The package 106 is processed to extract the key exchange footer 104 from the encrypted file 53E. The key exchange footer 104 is then transmitted to a key exchange server, shown generally at 16A, as shown on data flow path 112. As discussed above, the key exchange footer 104 may include the challenge, ESN of the recipient's token, and ESN of the originator's token device, and other relevant information. The relevant information may include encrypted versions of the electronic serial number of the recipient's token device and originator's token device, for example.

The key exchange server 16A may comprise a remotely located server, such as a sever 16 of the computer network 18. It is to be understood that the key exchange server 16A includes the components typically found in a computer server including, but not limited to, a processor, memory, and data storage means. The recipient's computer 14A may couple to the key exchange server 16A as discussed previously.

The key exchange server 16A, hereinafter server 16A, running the invented method, receives the key exchange footer 104 and extracts the challenge therefrom, as shown in process block 114. The server 16A uses the information stored in the challenge and generates the dynamic file key 71.

Simultaneously, as shown in process block 116, the server 16A generates a key exchange challenge. The server's key exchange challenge is transmitted to the recipient's token, shown on data flow path 118. The key exchange challenge is also used to generate a dynamic symmetric encryption key 119, shown in data block 120., The dynamic symmetric encryption key 119, hereinafter dynamic encryption key 119, and dynamic file key 71 are preferably fed into a AES data encryption/decryption algorithm running on the server 16A, in process block 122. The server 16A performs an encryption process, using the dynamic encryption key 119, to generate an encrypted dynamic file key 71E. The encrypted dynamic file key 71E is then transmitted to the recipient's token, shown in data flow path 126.

The recipient's token receives the server's key exchange challenge, as shown in process block 128, and processes the challenge as discussed previously. As shown in process block 130, the token's processor 32 uses the key exchange challenge, to generate the dynamic encryption key 119, shown in data block 132. The dynamic encryption key 119 generated by the token 30, is the same dynamic encryption key generated by the server 16A.

The encrypted file key 71E is received by the recipient's token in process block 134. In process block 136, the encrypted file key 71E and dynamic encryption key 119 are then fed into the token's processor 32 to perform a data decryption process, shown in process block 132. Preferably, the data decryption process comprises an AES data decryption process. The processor 32 uses the dynamic encryption key to decrypt the encrypted dynamic file key 71E, to generate the dynamic file key 71. Thus, the invented method is capable of generating encryption/decryption keys in a reduced amount of time, reducing the processing time of the invented method.

The encrypted file 53E is then decrypted by first extracting the decryption information footer 78 from the encrypted file 53E. The information in the footer 78 is then decomposed using the file key 71. The file 53E is decrypted using a process analogous to the encryption process discussed above. The file attributes are then restored, and the recipient 14A may freely access and manipulate the file 53.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for exchanging dynamic encryption keys, comprising:
    (a) generating (102) a key exchange package (106) by an originator computer (14) that includes an electronic serial number (ESN) of a first token device (30) and a first challenge, wherein said first token device comprises an encryption processor and previously entered first shared secrets, and wherein said first token device can create an originator dynamic encryption key based on the first challenge from said originator computer and said first shared secrets;
    (b) transmitting (110) the key exchange package (106) to a recipient computer (14A);
    (c) decomposing the key exchange package (106) to obtain key exchange information;
    (d) transmitting (112) the key exchange information to a server (16A); wherein said server has a copy of said first shared secrets from said first token device and wherein said server additionally has a copy of second shared secrets that reside on a second token device attached to said recipient computer;
    (e) using said key exchange information and said first shared secrets on said server to reconstruct the originator dynamic encryption key (71) and also generating (116) a second challenge responsive to receipt of the key exchange information and using the second challenge and said second shared secrets to encrypt said originator dynamic encryption key (71) to produce an encrypted dynamic encryption key (71E);
    (f) transmitting (118) the second challenge (128) and said encrypted dynamic encryption key (71E) to the second token device coupled to the recipient computer;
    (g) using the second token device to decrypt the originator dynamic encryption key (71) based upon the second challenge, the second shared secrets, and the encrypted dynamic encryption key thus resulting in an exchange of dynamic encryption keys from said originator computer to said recipient computer.

2. The method of claim 1 wherein the key exchange package includes an encrypted file.

3. The method of claim 1 wherein the key exchange package includes an encrypted file and key exchange information exclusive of dynamic file key.

4. The method of claim 1 wherein the dynamic encryption key is symmetric.

5. The method of claim 1, wherein the token device is a detachable USB token device that is attached to the computer by a computer USB port.

6. A method for exchanging dynamic file encryption keys, comprising:
    (a) coupling (54) a first token device (30) to an originator computer (14) and coupling a second token device to a recipient computer (14A), coupling the originator computer and the recipient computer to a network, wherein said token devices each include their own unique identification codes and their own unique and previously embedded symmetric shared secrets, and wherein each token device includes an on-board processor for advanced encryption standard (AES) processing;
    (b) transmitting (58) a first challenge generated by the originator computer to the first token device;
    (c) using the on-board processor and shared secrets of said first token device to generate (68) a puzzle key responsive to receipt of the first challenge;
    (d) using the on-board processor of said first token device to generate (71) a dynamic file encryption key based upon the puzzle key and said first challenge;
    (e) encrypting a data file into an encrypted data file with the dynamic file encryption key after decomposing said file into data blocks (74) and generating encrypted data blocks (74E);
    (f) appending decryption information (78) to a-n-the encrypted data file (53E);
    (g) appending key exchange information to the encrypted data file to generate a key exchange package (106), said key exchange information consisting of at least a first identification number of said first token device and said first challenge;
    (h) transmitting (110) the key exchange package (106) to a-the recipient computer (14A) coupled with a-the second token device having a second identification number and second shared secrets;

(i) decomposing the key exchange package to obtain the key exchange information;
(j) transmitting (112) the key exchange information and said second identification number to a server;
(k) using the key exchange information and a copy of said first shared secrets residing on said server to reconstruct said dynamic file encryption key (71); generating (116) a second challenge responsive to receipt of the key exchange information by the server, and using said second challenge, said second identification number, and a copy of said second shared secrets to encrypt said dynamic file encryption key (71);
(l) transmitting (118) the second challenge and said encrypted dynamic file encryption key (71 E) to the second token device coupled to the recipient computer; and
(m) using the second shared secrets on said second token device to decrypt the dynamic file encryption key (71) based upon the second challenge and the encrypted dynamic file encryption key.

7. The method of claim 6 wherein the key exchange package includes an encrypted file and key exchange information exclusive of dynamic file encryption key.

8. The method of claim 6 wherein the dynamic file encryption key is symmetric.

9. The method of claim 6, wherein either of the token devices is a detachable USB token device that is attached to the computer by a computer USB port.

* * * * *